(12) United States Patent
Hansen

(10) Patent No.: US 8,578,828 B2
(45) Date of Patent: Nov. 12, 2013

(54) SEPARATING DEVICE

(76) Inventor: Bernd Hansen, Sulzbach-Laufen (DE)

( * ) Notice: Subject to any disclaimer, the term of this patent is extended or adjusted under 35 U.S.C. 154(b) by 400 days.

(21) Appl. No.: 12/735,709

(22) PCT Filed: Feb. 7, 2009

(86) PCT No.: PCT/EP2009/000872

§ 371 (c)(1),
(2), (4) Date: Aug. 11, 2010

(87) PCT Pub. No.: WO2009/106219

PCT Pub. Date: Sep. 3, 2009

(65) Prior Publication Data

US 2010/0307309 A1      Dec. 9, 2010

(30) Foreign Application Priority Data

Feb. 28, 2008   (DE) .......................... 10 2008 011 772

(51) Int. Cl.
  *B29C 49/72*   (2006.01)
  *B26F 1/02*    (2006.01)
  *B26D 5/08*    (2006.01)

(52) U.S. Cl.
  USPC ................................ 83/615; 83/631; 83/914

(58) Field of Classification Search
  USPC ................... 83/615, 618, 627, 631, 632, 914
  See application file for complete search history.

(56) References Cited

U.S. PATENT DOCUMENTS

| | | | | |
|---|---|---|---|---|
| 2,438,951 A | * | 4/1948 | Stephens | 83/543 |
| 3,951,025 A | * | 4/1976 | White | 83/543 |
| 5,613,416 A | * | 3/1997 | Fujita | 83/98 |
| 5,669,296 A | * | 9/1997 | Newton | 100/99 |
| 7,427,258 B2 | * | 9/2008 | Schmauder | 83/55 |
| 2002/0069736 A1 | * | 6/2002 | Yasoda et al. | 83/62.1 |
| 2005/0000331 A1 | | 1/2005 | Farrell et al. | |
| 2007/0240551 A1 | * | 10/2007 | Erlenmaier | 83/523 |

FOREIGN PATENT DOCUMENTS

| | | |
|---|---|---|
| DE | 38 32 566 A1 | 4/1990 |
| EP | 0 539 169 A1 | 4/1993 |
| EP | 1 600 225 A1 | 11/2005 |
| EP | 1 604 803 A1 | 12/2005 |
| JP | 01-022422 A | 1/1989 |

* cited by examiner

*Primary Examiner* — Stephen Choi
(74) *Attorney, Agent, or Firm* — Roylance, Abrams, Berdo and Goodman LLP

(57) ABSTRACT

A separating device for cutting off individual containers (12) from a frame network made of a plastic material, particularly of polypropylene, has at least one punching device at least partially separating the containers (12) from a waste frame. Because the punching device can be moved by a ball screw drive (46) that can be driven by a drive unit, particularly in the form of an eclectic motor (48), along a punching axis (44) from a starting position to a punching position and back again, the separation can be done at high speed, determined by the screw shaft that can be driven by the electric motor.

20 Claims, 6 Drawing Sheets

SEPARATING DEVICE

FIELD OF THE INVENTION

The invention relates to a separating device for separating individual container products from a frame assemblage of a plastic material, particularly polypropylene, with at least one punching device which at least partially separates the container product from the frame waste.

BACKGROUND OF THE INVENTION

The prior art (DE 199 26 329 A1) discloses methods and devices for producing container products from plastic, how they are supplied to a generic separating device which is then used to separate these individual container products from a frame assemblage using a cutting or punching device.

To produce the respective container product, first a tube of plasticized plastic material is extruded into a molding device. One end of the tube is closed by heat sealing and by producing a pneumatic pressure which acts on the tube. The tube is expanded forms the container by being placed against the forming wall of the molding device of two opposite molding tools. Then the plastic container is filled under sterile conditions within the molding device by a corresponding filling mandrel. After removing the filling mandrel, it is then hermetically sealed with the formation of a definable head geometry. For the purpose of forming the actual plastic container, in which fluid is later stored, two container forming jaws are moved by a hydraulic driver toward one another to obtain the closed position and are moved in opposite directions away from one another into one of their open positions. In order to achieve very high ejection rates of container products here, DE 103 23 335 A1 describes a multi-station arrangement, where the various molding steps are divided among different stations located in succession on an imaginary circular arc so as to form a type of carousel arrangement which enables very high cycle frequencies for the plastic material to be ejected in the form of container products.

Since the contents to be placed in the respective container product is often very susceptible to ambient media, especially if it is, for example, a highly sensitive pharmaceutical, the prior art focuses on, for example, covering the fill opening of the container tube by a sterile barrier under a sterile space at least from its formation to filling of the pertinent container. Very good results can be achieved here when, as shown in DE 10 2004 004 755 A1, by the barrier when a sterile medium is moved in the direction of the container fill opening using a media conveyance device in order to further improve the sterility. Another or an additional measure to increase sterility is to simply provide higher processing temperatures, for example, when producing the tube for the container product or during the filling process of the fill material. An increased processing temperature finds its limits when the plastic material which is frequently used, such as polyethylene, is temperature-sensitive, but can otherwise be easily processed in the pertinent production devices and is preferred.

Otherwise, in addition to atmospheric oxygen, other gases can also diffuse later into the interior of the container through the thin polyethylene wall during storage and in distribution of the container product which has been produced under sterile conditions, and in this way, can damage the sensitive container contents or even make them unusable.

In order to eliminate this latter disadvantage, prior art production methods for these container products have suggested (DE 103 47 907 A1 and DE 103 47 908 A1) using co-extrusion production methods in which the container is built up from several layers of plastic material, often at least one of the layers being used as a barrier layer. Five and more layers, for example, formed from polyethylene and low-density polyethylene as well as copolymers (ethylene-vinyl alcohol copolymers) can form the multi-layer container wall which in this case then forms an effective barrier layer. These methods are cost-intensive in practical implementation. This makes the respective container product correspondingly more expensive.

If the individual container products arrive filled from the respective production machine, they emerge as ampule blocks in which several ampules or containers located next to one another in the manner of a block assemblage or frame assemblage have a common wall with one another. In order to detach the containers or ampules from the block or frame assemblage, they are cut out or punched out along edge zones. A certain amount of frame waste then is produced which can be recycled with modern techniques. DE-PS 38 31 957 discloses a method for producing hollow container products from plastics which initially emerge as an ampule block or a frame assemblage. In the edge zone of the frame waste, a hollow body is additionally molded in. This hollow body increases the stability of the frame assemblage and also helps facilitate separation of the container product from the frame waste by the separating device used in each case.

SUMMARY OF THE INVENTION

An object of the invention is to provide an improved separating device with which the container products, regardless of the plastic material forming them, can be separated from the frame assemblage at high speed, and which in addition to a high degree of operating reliability also has relative low production costs.

This object is basically achieved by a separating device where the punching device can be moved from an initial position into the punching position along a punching axis and vice versa by a ball screw which can be driven by a drive unit, especially in the form of an electric motor. Separation can be done with a very high speed, dictated by the threaded spindle which can be driven by the electric motor. Additional mechanical components for applying a positive force to the punching body in setting up the separation line can be omitted. The ball screw used makes it possible to reduce the energy used correspondingly. This reduced energy usage benefits economical operation of the separating device.

In particular, it has been shown that with the separating device according to the invention, polypropylene as the wall material can be used for the container products, a plastic material which is brittle compared to a polyethylene material and which otherwise can be processed only with difficulty using conventional punching and cutting devices for container separation. To the extent conventional separating devices are used, it has been shown that with respect to the very high processing temperatures of polypropylene it would be necessary to wait several minutes until the punching and cutting process is possible at all. This delay would necessarily lead to very long retention sections and/or require additional cooling for the container products to be separated in order to be able to undertake separation at all without scrap. Due to the punching device which can be triggered by the ball screw, clean separation can take place without these waiting times or additional cooling, simply by the respective container product being knocked out of the still warm or hot frame assemblage at high speed by the spindle drive along the intended punching lines. It is surprising to one with average skill in the art in the field of these separating devices that he will arrive at these clean separating punching lines with the cutting edges of the punching device which are kept relatively blunt and which need not be further reworked (ground) or otherwise maintained. This ability was not possible in the past with devices in the prior art.

The advantage of using polypropylene material instead of polyethylene or a coextruded multilayer composite of LDPE/MDPE is that the polypropylene material at higher temperatures (121° C.) can be autoclaved. The polypropylene material is obtainable from only one extrusion head in a much more favorable manner than the described multilayer system. Thus, ultimately each individual layer to be produced in a multilayer system requires its own extrusion head in the production machine. This requirement increases production cost accordingly also from the control side.

Provided that the separating device according to the invention is used with the punching device which can be driven by the ball screw, this application is not limited thereto. Rather, there are a host of possible applications, and the separating device according to the invention can also be used for other plastic materials such as polypropylene or multilayer plastic systems for separation of the container product as necessary.

In one preferred embodiment of the separating device according to the invention, a damping system prevents overloading of the ball screw in the punching process. The damping system has preferably at least one energy storage (compression spring) which decouples the punching device from the ball screw at least during the punching process. In this way the punching process can be initiated especially carefully and the ball screw is relieved. This arrangement increases its service life.

The separating device according to the invention is made in the form of a column structure with individual guide and adjustment plates which are spaced apart from one another. The column structure in addition to adjustment columns also has guide columns which together with the assignable plates lead to a highly reinforced pedestal construction.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale.

In some of the figures, components of the overall device are omitted for purposes of clarity of the solution according to the invention.

DETAILED DESCRIPTION OF THE INVENTION

Figure 1:
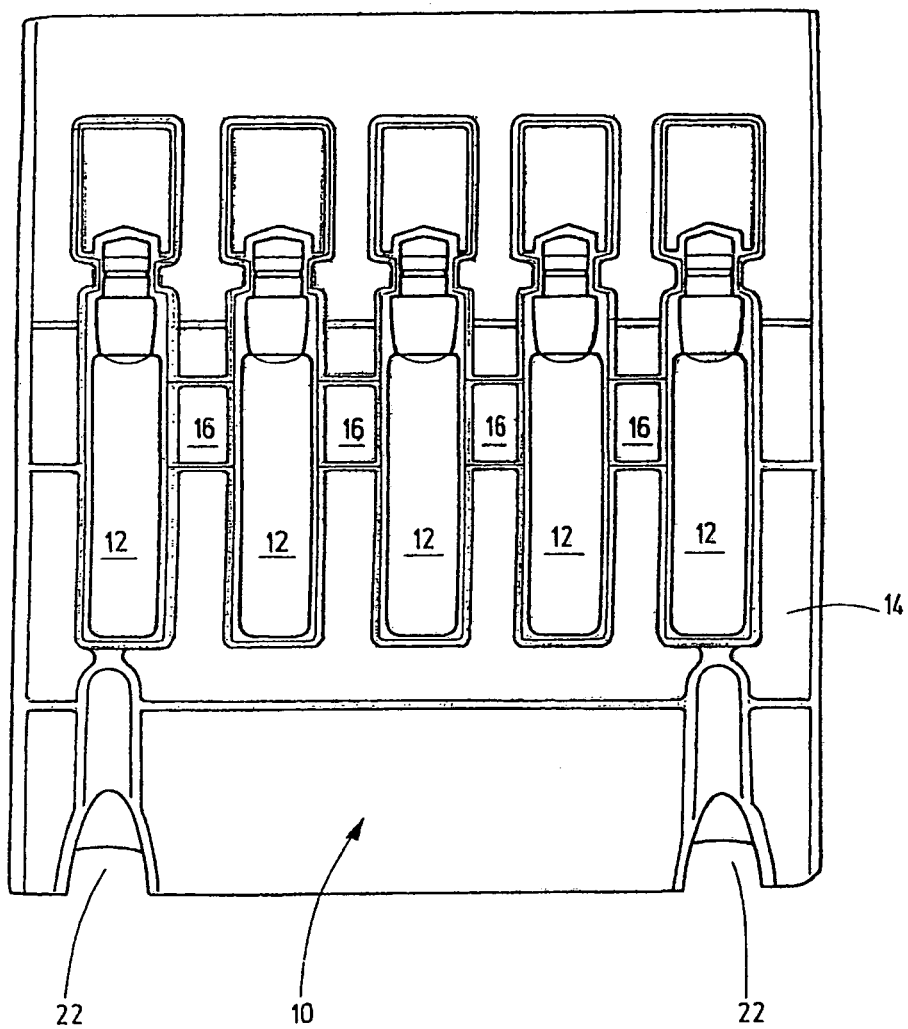
FIG. 1 is a top plan view of a frame assemblage of an ampule block and a frame waste.
Figure 2:
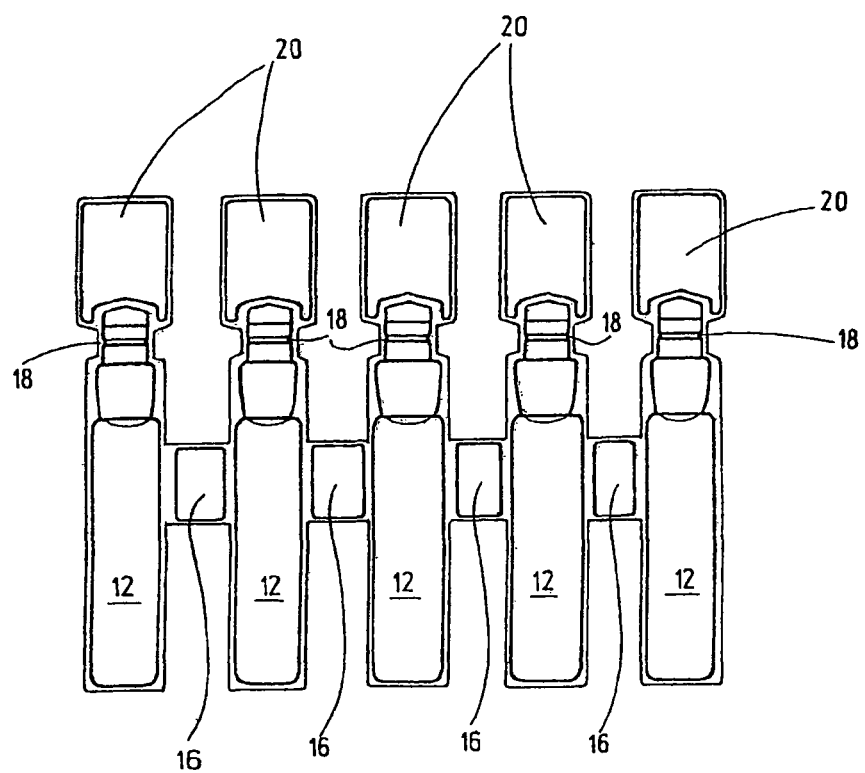
FIG. 2 is a top plan view of the ampule block of FIG. 1 from which the frame waste has been largely removed, and in which the individual container products are detachably connected to one another with intermediate wall webs as a commercial unit.

The frame assemblage 10 shown in FIG. 1 is formed of a plastic material, in this case of a polypropylene material. The frame assemblage 10 is composed essentially of the actual container products 12 and the frame waste 14 which can be separated from the actual container products 12. When the container products 12 are separated from the frame waste 14, an ampule block from which the frame waste 14 has been removed as shown in FIG. 2 results. The individual containers or individual ampules 12 are detachably connected to one another by the remaining intermediate wall webs 16 of the frame waste 14, the intermediate wall webs 16 making it possible for the respective container product 12 to be separated from the other containers 12 remaining in the block in a twist-off motion.

The respective container product 12 is known in the prior art, with the above-described ampule block solution shown, for example, in DE 38 31 957 C1. The basic form shown in FIGS. 1 and 2 constitutes only one type of one exemplary embodiment. The container geometries in particular can be stipulated by the user within a widely drawn scope. To release the respective container contents, generally in the form of a fluid which has been added beforehand, a twist-off cap 18 is used which likewise can be separated via a corresponding scored site by a twist-off motion from the remaining container product 12 by a handle 20, with the result that the fluid can be removed via the cleared container opening. Other container opening solutions such as dropper caps, etc., can likewise be implemented.

On the bottom of the frame assemblage 10 as shown in FIG. 1 a type of blind holes 22 are made. Using the pins of a transport (not shown) which engage the blind holes 22 on the lower edge of the frame waste 14, the frame assemblage 10 of the container products 12 and the frame waste 14 is removed from the tool of a production machine which is not detailed. Due to the higher stability of the frame waste in the form of an inherently closed waste edge zone, removal is easily and reliably possible when the plastic of the frame assemblage 10 has not yet completely cooled. This configuration is conventional and is shown, for example, in EP 0 359 971 A2 so that it will not be further detailed here.

Furthermore, it is also possible to arrange the blind holes 22 or other engagement option for a transport unit, viewed in the direction of looking at FIG. 1, laterally in a vertical alignment as part of the frame waste 14 on the latter, provided that, instead of the horizontally running transport direction which is shown in FIG. 1, a direction perpendicular thereto, i.e., in the direction of the longitudinal axes of the container, is desired. How the frame assemblage is suitably placed in the separating device as a cutting or punching device or is retrieved from it again is, for example, the subject matter of DE 38 32 566 C2 in which a moving transport hook engages the transport recesses in the frame waste of the frame assemblage 10.

Figure 8:
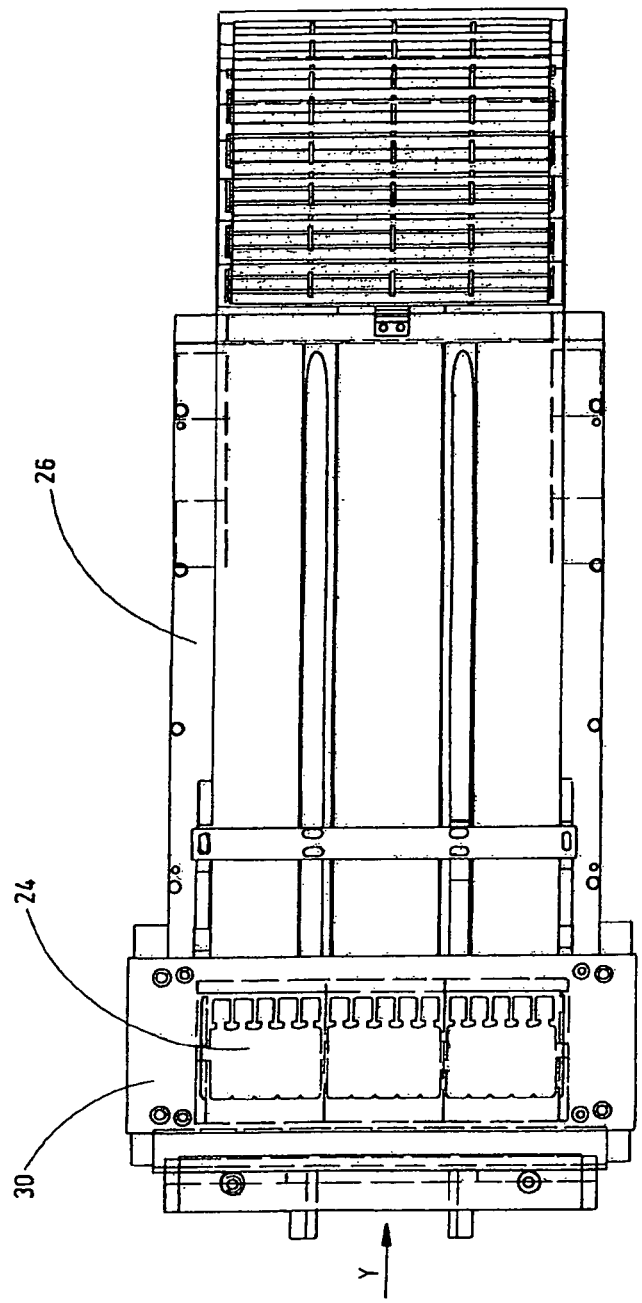
FIG. 8 is a top plan view of the punching die as shown in FIG. 3 with a transport for delivery of the container products to be separated from the frame assemblage.

For a separating or punching process, viewed in the direction of FIG. 8, originating from a production machine which is not detailed, the respective frame assemblage 10 moves from right to left into a die 24, the die 24 shown in FIG. 8 constituting a receiving option for three frame assemblage arrangements 10 next to one another, with five connected container products 12 each. The respective container products 12 originating from the production machine are connected to one another by the frame waste 14. After the punching or separating process a container assemblage as shown in FIG. 2, viewed in the direction of FIG. 8, leaves the die 24 on the left side in order to be then packed into the corresponding packaging units for further transport. Moving the respective frame assemblage 10 with the container products 12 into and out of the die 24 by the transport 26 is prior art so that it will not be further detailed here.

Figure 3:
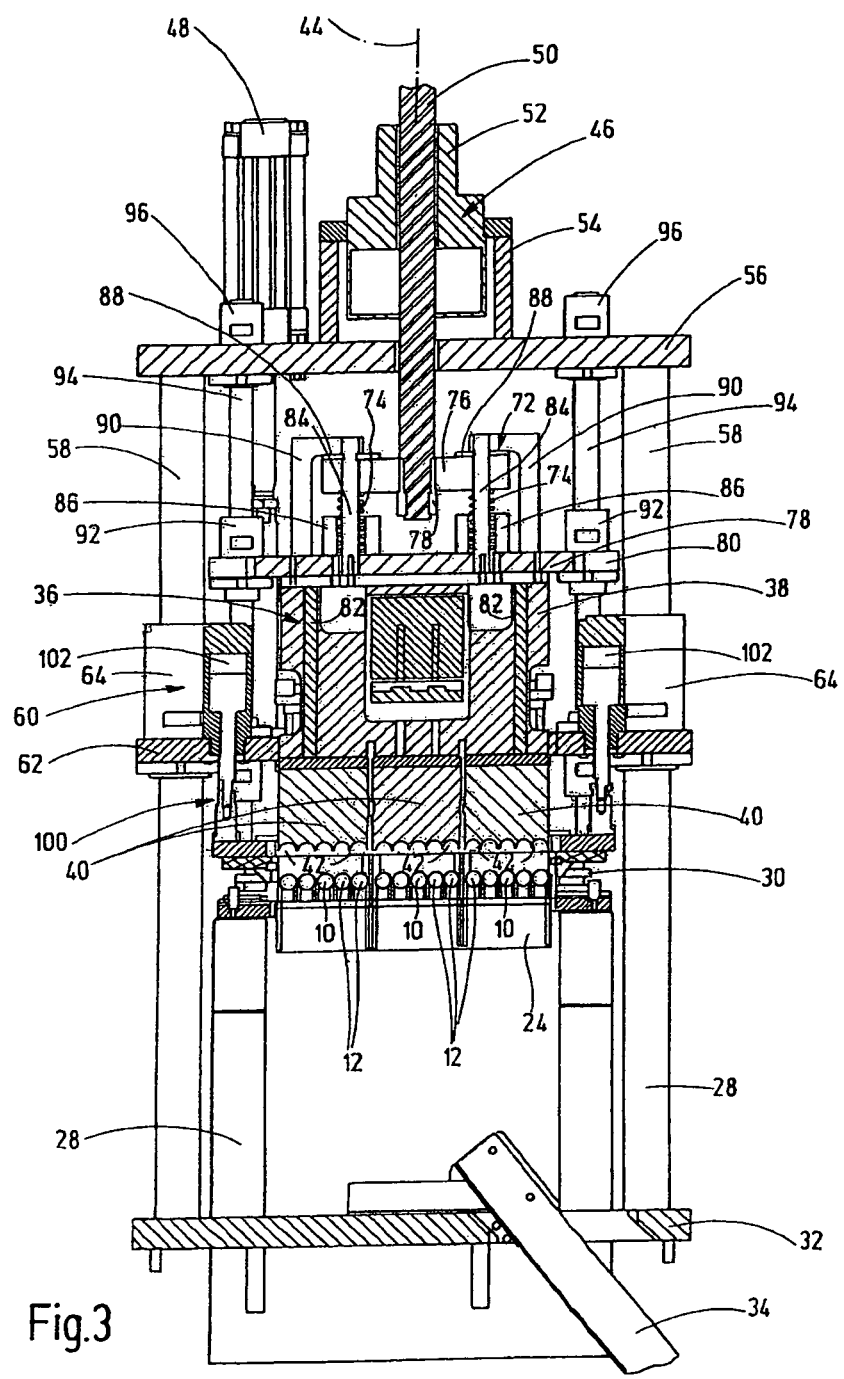
FIG. 3 is a front elevational view, partially section of a separating device according to an exemplary embodiment of the invention.

FIG. 3, viewed in the direction of arrow Y of FIG. 8, shows a rear view of the die 24 again with three frame assemblage units 10 with five container products 12 each. As furthermore follows from the backward front view as shown in FIG. 3, the die 24 of a solid metal block is moved upright via support columns 28 extending between a die frame 30 for the die 24 and a lower base plate 32 which a slide 34 reaches through used to remove the plastic waste from the separating device. The lengths of the four support columns 28 are preferably adjustable in order to enable alignment of the die 24 according to given production criteria. The rectangularly made lower base plate 32 allows a modular structure for the entire separating device so that a unit results which is easy to install and which can be easily integrated into the sequence of production machines which are already present.

The separating device shown in FIG. 3 has a punching device 36 which comparably to the die 24 has a solid metal frame block and can be made in several parts. To increase the punching or cutting pressure, a block-like charge weight 38 can be used, whose bottom is joined to individual upper dies 40 which in turn on their bottom have punching blades 42 which enable separation of the frame waste 14 from the container products 12 in order to move from a preliminary product as shown in FIG. 1 to the finished container product assemblage as shown in FIG. 2. In this respect the strip-like punching blades 42 travel into the intermediate intervals between the container products 12 held in the die 14 for each frame assemblage 10. This arrangement is only exemplary to the extent one or two units of the frame assemblage 10 or larger units of frame assemblage arrangements with a different number of container products 12 can also be processed. The respective arrangement is dictated by the machine operator and his requirements.

To move the block shaped punching device 36 along a punching axis 44, a ball screw 46 is used which can be actuated by an electric motor 48. The electric motor 48 can be especially a conventional servo motor with short operating times relative to the respective switchover direction. The ball screw 46 has a rod shaped ball roller spindle 50 which, guided in a threaded bushing 52 viewed in the direction of FIG. 3, can be moved down from the raised position shown in FIG. 3 into the punching or separating position along the punching axis 44. For this purpose, the electric motor 48 drives the threaded bushing 52 by an output pinion (not shown), for example, by a toothed frame drive which is not detailed. The bushing is guided to be able to rotate in a rotary receiver 54. This belt drive runs within an upper base plate 56 which terminates the separating device as a unit toward the top. The electric motor 48, the rotary receiver 54 with the threaded bushing 52, and part of the ball roller spindle 50 project with a definable excess length over the upper base plate 56, viewed in the direction of FIG. 3.

Figures 4, 5:
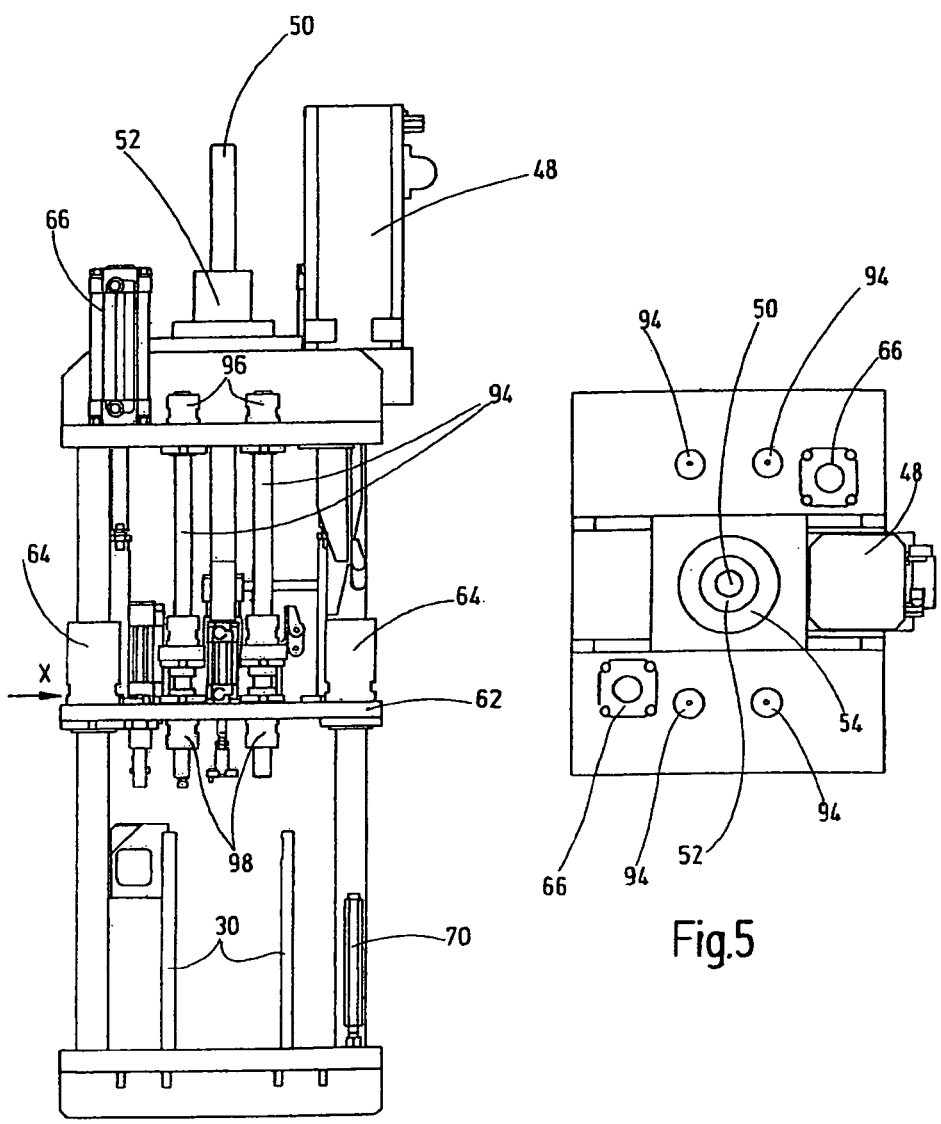
FIG. 4 is a front elevational view of the separating device of FIG. 3, shown without a punching device and die.
FIG. 5 is a top view of the separating device of FIG. 3.

To reinforce the overall system, four adjustable columns 58 extend between the lower base plate 32 and the upper base plate 56. Relative to the punching axis 44, columns 58 are arranged in pairs diametrically opposite one another (cf. FIG. 7). The four adjustable columns 58 as part of an adjustment device 60 extend through a square adjustment plate 62 provided with four adjustable bushings 64 which extend around the respective adjustable column 58. Another part of the adjustment device 60 on the top of the upper base plate 56 comprises two working cylinders 66 (cf. FIG. 6) which, made in the manner of hydraulic or pneumatic cylinders. By adjustable rods 68 fixed with their lower end on the adjustment plate 62, vertical adjustment is induced along the adjustable columns 58. For the sake of visual simplicity, FIG. 3 does not show this cylinder arrangement 66 with adjustable rods 68. For the sake of simplicity FIGS. 4 and 6 have also omitted the punching device 36. With the indicated adjustment device 60, depending on the conditions of use on site, the punching plane for the punching device 36 can be adjusted. Viewed in the direction of FIG. 4, the adjustment plane toward the bottom can be bordered by a stop body 70.

Furthermore, a damping system 72, shown in FIG. 3, also contributes to helping prevent overloading of the ball screw 46 in operation, especially in a punching process itself. For this purpose the damping system 72 has an energy storage in the form of two compression springs 74 which the punching device 36 decouples from the ball screw 46. For this purpose, the two compression springs 74 with their top which is shown in the direction of FIG. 3 are supported on a stop plate 76 permanently connected to the lower end of the ball roller spindle 50 by a fixing nut 78. The lower end of the respective compression spring 74 is supported on a guide plate 80, whose bottom, permanently connected by retaining rods 82, is adjoined by the punching device 36. Instead of the compression springs 74 as the energy storage, another solution can be used, for example, in the form of a disk spring or the like.

In the embodiment as shown in FIG. 3, however, the respective compression spring 74 encompasses a guide pin 84 which forms a guide for the stop plate 76 which in this respect can be moved back and forth between two end positions by the ball roller spindle 50. The lower possible end position is formed by lower buffer bushings 86 which can be made as an elastomer material and encompass the respective compression spring 74 in addition to the guide pin 84. In the other stop situation which is pointed upward, the top of the stop plate 76 has annular vibration compensators 88 which are supported on angled boundary strips 90, provided that the ball roller spindle 50 assumes its nonactuating position assumed in FIG. 3.

When the electric motor 48 is started and a punching process is to be undertaken, the ball roller spindle 50 is moved down along the punching axis 44, viewed in the direction of FIG. 3, and the stop plate 76 is entrained against the action of the two compression springs 74 until it comes into contact with the top of the buffer bushings 86. In the continuing downward motion the punching process is then induced by the punching device 36 for the respective frame assemblage 10. If the ball roller spindle 50 is moved up in the reverse sequence, the stop plate 76 is entrained upward until it engages, from underneath, the angular offsets of the two boundary strips 90 as shown in FIG. 3, this striking motion being cushioned by the vibration compensators 88.

Figures 6, 7:
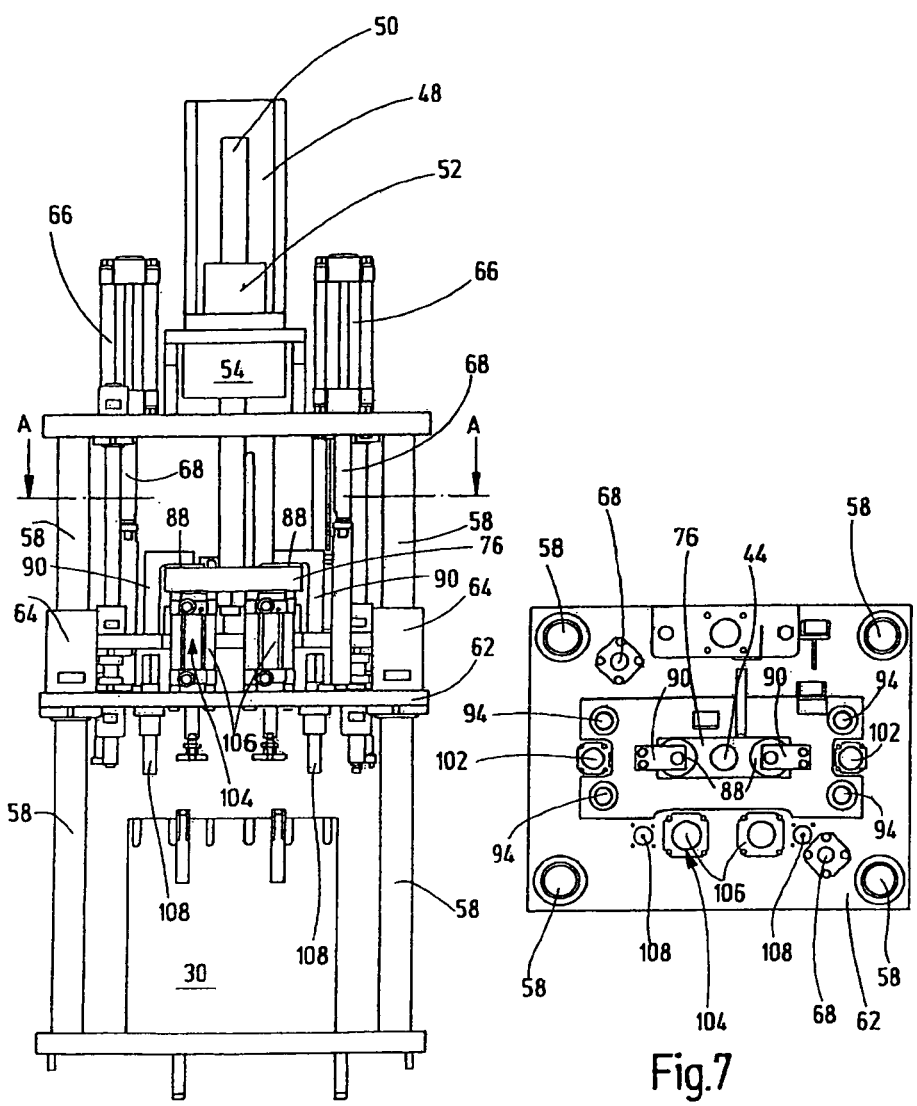
FIG. 6 is a side elevational view of the separating device of FIG. 3 viewed in the direction of arrow X in FIG. 4.
FIG. 7 is a top plan view in section of the separating device of FIG. 5 taken along line A-A in FIG. 6.

The guide plate 80 is in turn guided along four guide columns 94 by the corresponding guide bushings 92. As FIG. 7 shows in particular, these guide column 94 are in turn located diametrically opposite one another to the punching axis 44 and lie within the outer peripheral plane with the four adjustable columns 58. In order to be able to ensure that the individual components can move smoothly, the block-like punching device 36 as a whole extends through the corresponding rectangular recess in the adjustment plate 62. The four guide columns 94 are guided on the top of the upper base plate 56 in receivers 96 which are otherwise held on their lower opposite end (cf. FIG. 4) in guide receivers 98 on the bottom of the adjustment plate 62, which guide receivers allow movement for the guide columns 94 in the axial direction parallel to the punching axis 44. Transversely thereto they enable a defined position in the radial direction. In this way relative adjustment of the adjustment plate 62 to the guide plate 80 is possible.

The punching device 36 is furthermore at least partially encompassed by a hold-down device 100 made as a plate-like hold-down frame. Hold-down device 100 can be raised and lowered by two working cylinders 102 (see FIG. 3). In the lowered position the hold-down device 100 is used to press down the frame waste 14 in the direction of the die frame 30 to ensure clean contact of the respective frame assemblage 10 in the pertinent recess of the die 24. The required working cylinders 102 are preferably driven hydraulically, pneumatically, or servoelectrically, and are permanently connected with their housing parts to the adjustment plate 62 so that the hold-down device 100 can move relative to the adjustment plate 62. To be able to ensure undisrupted operation for the stop plate 76 in the sense that it can move up and down parallel to the punching axis 44, as follows especially from FIG. 7, the stop plate 76 is provided with two U-shaped recesses through which the housing parts of the respective working cylinder 102 extend.

Furthermore, the separating device according to the invention has an ejector 104 (FIG. 7) which ejects the plastic waste of the assemblage 10 which may remain, for example, in the punching device 36 via the slide 34. For this purpose the ejector 104 preferably has two hydraulically, pneumatically, or servoelectrically actuatable working cylinders 106 which actuate two ejector pins 108 which, viewed in the direction of FIG. 6, project underneath the adjustment plate 62. Conversely, the working cylinders 106 are located above the adjustment plate 62.

For the sake of better understanding, a sequence for a punching process will be described below. The strip of ampules with the three frame assemblage units 10 is transported into the separating device in the manner of a punch by a definable cycle advance. When the respective frame assemblage 10 has advanced to above the die 24, the block-like punching device 36 is moved into the punching position by vertical lowering within the scope of the cycle advance. Afterwards, the hold-down device 100, actuated pneumatically, presses from overhead on the strip of ampules and clamps it between the hold-down device 100 and the die 24. Afterwards, the actual punching stroke is triggered, the electric motor 48 actuating the ball screw 46 in the connected position. The described damping system 72 prevents overly large impacts from being transmitted to the threaded spindle during the punching process, for example, in the form of the ball roller spindle 50. When the punching stroke has ended, pneumatically actuated ejector pins 108 press the ampules 12 which may have become caught in the punch of the punching device 36 onto a support (slide 34). One cycle behind the punching position of the ampules 12, shortly after punching of the ampules, the waste strip in the form of the frame waste 14 is crushed by pneumatic punching (not shown).

After the punching processes, ejector pins 108, the punch in the form of a punching device 36 with the punching blades, and the hold-down device 100 and support for the cycle advance move up again and the next cycle can begin. For better accessibility in installation and maintenance, a maintenance stroke can be executed in which the upper structure and therefore the adjustment plate 62 are moved away toward the top. The ball screw 46 with the triggerable threaded spindle allows very prompt feed processes and delivery of very high punching forces via the punching device 36. This operation had not been achieved in this way to date with the conventional arrangement. So that the punching device 36 does not collide with the lower die 24, there can be stops, detection sensors, and/or monitoring electronics for the electric motor 48.

While one embodiment has been chosen to illustrate the invention, it will be understood by those skilled in the art that various changes and modifications can be made therein without departing from the scope of the invention as defined in the appended claims.

What is claimed is:

1. A separating device for separating individual plastic container products from a frame assemblage, comprising:
    at least one punching device at least partially separating a plastic container product from a plastic frame waste and being movable between initial position into a punching position along a punching axis;
    a ball screw driven by a drive unit operatively coupled to said punching device to move said punching device between said initial position and said punching position along said punch axis; and
    a damping system operatively coupled to said ball screw and preventing overloading of said ball screw, said damping system including at least one energy storage decoupling said punching device from said ball screw.

2. A separating device according to claim 1 wherein the plastic container products are formed of polypropylene.

3. A separating device according to claim 1 wherein said drive unit is an electric motor.

4. A separating device according to claim 1 wherein said energy storage is a compression spring.

5. A separating device according to claim 1 wherein
    said energy storage extends between a stop plate connected to a roller spindle of said ball screw and a guide plate with said punching device.

6. A separating device according to claim 5 wherein
    said stop plate in a raised position of said punching device strikes a stop of said guide plate, said guide plate being guided along at least one guide column.

7. A separating device according to claim 1 wherein
    an adjustment plate is vertically adjustable by at least one adjustable column to adjust a punching plane of said punching device.

8. A separating device according to claim 7 wherein
    said punching device comprises a guide plate guided along at least one guide column;
    said guide column extends through said adjustment plate and is at least partially fixed on said adjustment plate; and
    said adjustable column is farther away from a punching axis of said punching device than said guide column.

9. A separating device according to claim 8, wherein
    said punching device is at least partially encompassed by a hold-down device, said hold-down device being raisable and lowerable by at least one working cylinder connected to said adjustment plate.

10. A separating device according to claim 7 wherein
    said punching device is at least partially encompassed by a hold-down device, said hold-down device being raisable and lowerable by at least one working cylinder connected to said adjustment plate.

11. A separating device according to claim 10 wherein
    said hold-down device presses the frame assemblage with the container products for punching against a die having recesses at least partially accommodating the container products.

12. A separating device according to claim 9 wherein said hold-down device presses the frame assemblage with the container products for punching against a die having recesses at least partially accommodating the container products.

13. A separating device according to claim 7 wherein said adjustment plate comprises an ejector to eject container products of the frame assemblage remaining in said punching device.

14. A separating device according to claim 4 wherein an adjustment plate is vertically adjustable by at least one adjustable column to adjust a punching plane of said punching device.

15. A separating device according to claim 14 wherein said punching device comprises a guide plate guided along at least one guide column;
said guide column extends through said adjustment plate and is at least partially fixed on said adjustment plate; and
said adjustable column is farther away from a punching axis of said punching device than said guide column.

16. A separating device according to claim 15, wherein said punching device is at least partially encompassed by a hold-down device, said hold-down device being raisable and lowerable by at least one working cylinder connected to said adjustment plate.

17. A separating device according to claim 14 wherein said punching device is at least partially encompassed by a hold-down device, said hold-down device being raisable and lowerable by at least one working cylinder connected to said adjustment plate.

18. A separating device according to claim 17 wherein said hold-down device presses the frame assemblage with the container products for punching against a die having recesses at least partially accommodating the container products.

19. A separating device according to claim 16 wherein said hold-down device presses the frame assemblage with the container products for punching against a die having recesses at least partially accommodating the container products.

20. A separating device according to claim 14 wherein said adjustment plate comprises an ejector to eject container products of the frame assemblage remaining in said punching device.

* * * * *